Nov. 24, 1931. A. E. SPINASSE 1,833,380
METHOD OF AND APPARATUS FOR DRAWING GLASS
Filed July 31, 1926
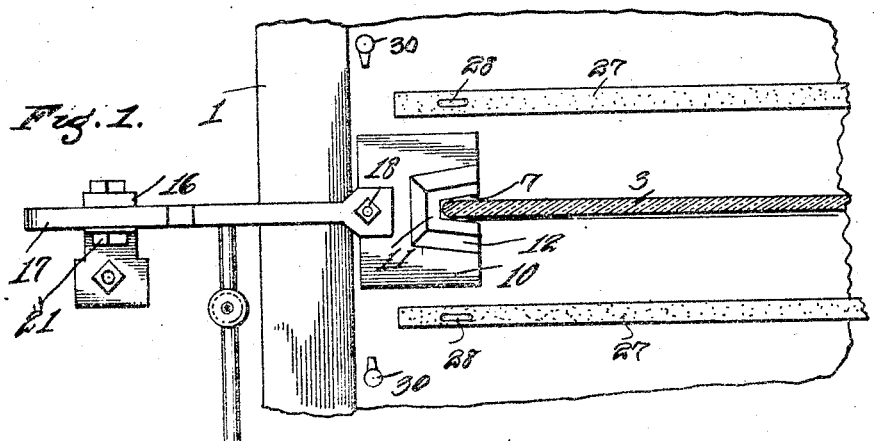
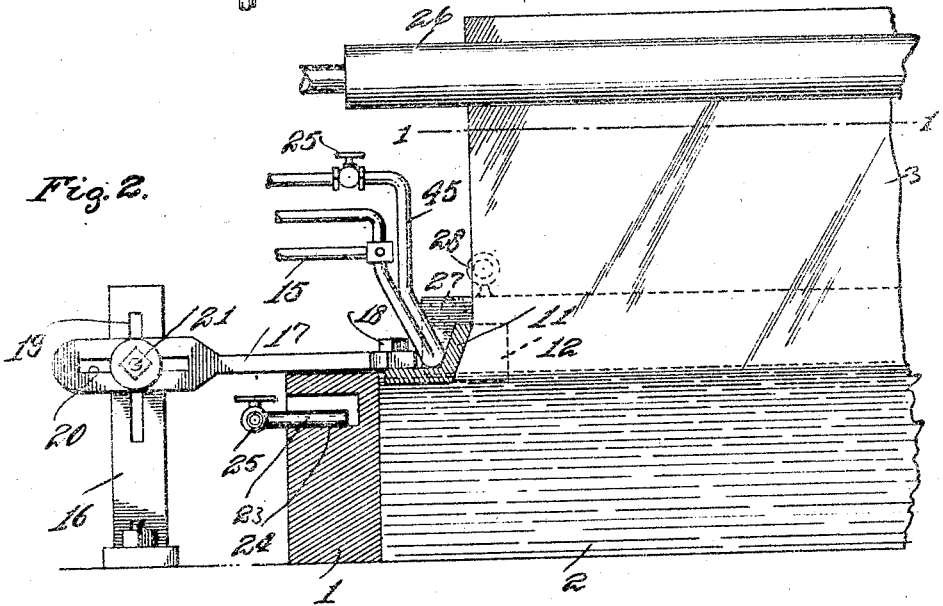
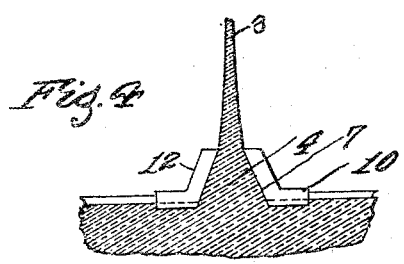
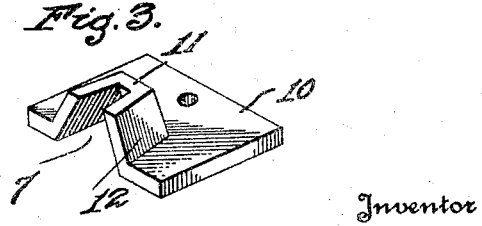
Inventor
Arthur E. Spinasse Patented Nov. 24, 1931

1,833,380

UNITED STATES PATENT OFFICE

ARTHUR E. SPINASSE, OF MOUNT VERNON, OHIO, ASSIGNOR TO PITTSBURGH PLATE GLASS COMPANY, A CORPORATION OF PENNSYLVANIA

METHOD OF AND APPARATUS FOR DRAWING GLASS

Application filed July 31, 1926. Serial No. 126,287.

The present invention relates to improvements in method of and apparatus for drawing glass, and is a continuation in part of my similarly entitled co-pending application Serial No. 702,198, filed March 27, 1924.

It is an object of the invention to provide an improved method and apparatus for drawing the flat sheets of glass of substantially uniform thickness to and including the edges or margin portions of the sheet, and to prevent the shrinking inwardly of the edges of the sheet as the sheet is drawn upwardly from the glass bath.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary top plan view of an apparatus constructed according to the present invention.

Figure 2 is a vertical section through the same.

Figure 3 is a perspective view of one of the slot members employed, and

Figure 4 is an end view of the slot member showing a portion of the glass bath and the glass sheet drawn therethrough.

Referring more particularly to the drawings, 1 designates one of the walls of the furnace containing the molten glass or the glass bath 2, and 3 represents the sheet of glass which is drawn upwardly from the bath by an appropriate bait or other drawing tool, the sheet being drawn through the usual drawing rolls 26.

In Figure 1, shield members 27 are shown as placed parallel with the drawn glass sheet 3 to cut off and regulate the furnace heat from the side portions of the sheet. In Figure 1, are also shown the burner jets 30 to locally increase or decrease the temperature in the region where the edges of the sheet are drawn.

For convenience in illustration only one edge of the glass sheet is shown but it will be understood that the same parts may be duplicated at the opposite edge of the sheet.

In accordance with the invention I provide a slot member 10 preferably in the form of a plate, as shown more particularly in Figure 3. The plate is made with the slot 7, which slot is continued upwardly through the flanges or upstanding walls 12, which walls may be made as a part of the plate if desired, and the plate may be made of metal, refractory clay or other material. The slot 7 may be tapered if desired, narrowing upwardly as indicated in Figure 4, and the slot may be wider at its outer open portion and taper inwardly to the acute angle portion 11.

The plate 10 is perforated to receive the substantially vertical pivot bolt or pin 18 by which the plate may swing in a horizontal plane for purposes of adjustment. The pin 18 adjustably secures the plate 10 to the slotted link member 17 having the horizontally disposed closed slot. This link member 17 is secured to the pedestal or base member 16 having the vertical slot 19. A bolt or pivot pin 21 is made to pass through the slots 20 and 19, whereby to secure the link member 17 in adjusted position. The link member may be adjusted up and down the pedestal or base member 16; it may be adjusted horizontally by virtue of the slot 20, or it may pivot in a substantially vertical plane about the pin or fulcrum 21. A heating and cooling means may be provided in conjunction with the slot member if desired and in Figure 2, I illustrate one form of such device as consisting of the pipe 45 bent upon itself and supported as upon the arm 15. The pipe is provided with a valve 25 in its induction branch to control the flow of the cool or hot fluid medium thereto. The bight of the pipe may be disposed close to the portion of the plate 10 or glass edge forming member which is close to or in contact with the edge of the sheet. It will be understood that although the side walls of the slot in the slot member are shown as straight, these walls may be rounded.

In the furnace wall 1 is shown a pocket or channel 24 extending close to the point of generation of the edges of the sheet, and in this channel or pocket I dispose a pipe or nozzle 23 for conveying temperature-affecting medium to the pocket or channel under the control of a valve 25' to increase and decrease the viscosity of the glass at the source of the drawn edge.

According to the improved method and operation of the apparatus, the glass is gathered upon an appropriate bait or other tool from the free natural surface of the bath 2, the edges and margin portions being drawn upwardly through the slot members. These slot members are so positioned that their bottom portions either rest upon the surface of the glass or such slot members penetrate slightly below the top surface of the glass bath. At the base of the drawn sheet, when thus freely drawn, a thickened portion 4 naturally forms from the free surface of the bath. This portion forms in inverted V-shape. The slot members are placed at or in the bath of glass in position to receive the base portion of this thickened or wedge-shaped part of the glass sheet whereby to partially reduce this thickened portion at the edges and margin of the glass sheet.

Necessarily a retarding frictional action upon the upwardly drawn glass takes places in the slot member, resulting in the longitudinal stretching of the border portions of the sheet from the drawing device to the slot members, and this will also result in counteracting the transverse collapse or shrinkage of the sheet between the stretched border portions. Although it is not necessary that the glass adhere to the walls of the slot members, I prefer that the glass adhere thereto. The member 10 may be preheated before placing it in the bath to secure and maintain such adhesion, such adhesion producing a better edge and a better temper in the sheet. After being placed in the position indicated, the member will be retained in its heated condition by the furnace heat and the burners 30 may also assist toward this end. By the use of the pipe 45 or other device I am enabled to regulate the degree of the adhesion to insure that the width of the sheet will be maintained uniform during drawing and to produce an edge of desired thickness. At times the jet 24 may be put into operation to control the anchorage at the source of the drawn edge. With the upwardly extending flange 12, I secure an elongated upwardly extending slot for gradually reducing the thickness of the glass.

The plate 10 serves to protect the drawn edge of the sheet from the radiating heat from the bath and the upwardly extending wall 12 of the slot member, which projects above the plane of the plate 10, protects the drawn edges of the glass from the furnace heat, as well as to shape said edge in desired reduced thickness. By reason of the position of the preheated edge forming members, the same are maintained hot and therefore adhere to the drawn glass. By use of the invention much breakage is eliminated.

From the above it will be understood that the edging members have slots which engage the tapering base of the drawn glass at a point below the upper reduced end of the tapering base, said slots being narrower than the normal thickness of said tapering base at the point of engagement therewith to partially reduce the thickness thereof, and being wider than the thickness of the finished edges of the sheet to create a dragging action at the contracted portion of the tapering base and at the same time preserving sufficient tapering thickness above the contracted portion to prevent injury to the draw.

What is claimed is:—

1. In apparatus for drawing sheet glass from the free surface of a bath of molten glass at a particular level, edging devices for preventing the narrowing tendency of the sheet comprising a pair of horizontal plates having each spaced apart walls upwardly extending above the bath to form a slot adapted to embrace the initially drawn border portions of the sheet, the walls forming the slot being adapted to adherently engage the side faces of the rising border portions to shape said portions and prevent the narrowing of the sheet, and said horizontal plates extending from and lying remote on each side of the slot in contact with the bath to shield the rising border portions above the slots from the molten bath below.

2. In apparatus for drawing sheet glass from the free surface of a bath of molten glass at a particular level, edging devices for preventing the narrowing tendency of the sheet comprising a pair of horizontal plates having each spaced apart walls upwardly extending above the bath to form a slot adapted to embrace the initially drawn border portions of the sheet, the walls forming the slot being adapted to adherently engage the side faces of the rising border portions to shape said portions and prevent the narrowing of the sheet, said horizontal plate extending from and lying remote on each side of the slot in contact with the bath to shield the rising border portions above the slots from the molten bath below, and means for adjusting said devices in desired fixed position.

3. In apparatus for drawing sheet glass from the free surface of a bath of molten glass at a particular level, edging devices for preventing the narrowing tendency of the sheet comprising a pair of horizontal plates having each spaced apart walls upwardly extending above the bath to form a slot adapted to embrace the initially drawn border portions of the sheet, the walls forming the slot being adapted to adherently engage the side faces of the rising border portions to shape said portions and prevent the narrowing the sheet, said horizontal plates extending from and lying remote on each side of the slot in contact with the bath to shield the rising border portions above the slots from the molten bath below, and means for modifying and controlling the temperature of the glass adjacent the slots in said devices.

In testimony whereof I affix my signature.

ARTHUR E. SPINASSE.